(12) United States Patent
Dinning et al.

(10) Patent No.: US 10,331,395 B2
(45) Date of Patent: Jun. 25, 2019

(54) GAME DISPLAY ARRANGEMENT AND SYSTEM FOR DISPLAYING A GAME RESULT FROM A GAME RESULT GENERATOR

(71) Applicant: NOVOMATIC AG, Gumpoldskirchen (AT)

(72) Inventors: Andrew Dinning, Bath (GB); Ronald Watts, Cardiff (GB)

(73) Assignee: NOVOMATIC AG, Gumpoldskirchen (AT)

( * ) Notice: Subject to any disclaimer, the term of this patent is extended or adjusted under 35 U.S.C. 154(b) by 190 days.

(21) Appl. No.: 14/780,885

(22) PCT Filed: Mar. 28, 2014

(86) PCT No.: PCT/EP2014/056333
§ 371 (c)(1),
(2) Date: Sep. 28, 2015

(87) PCT Pub. No.: WO2014/154881
PCT Pub. Date: Oct. 2, 2014

(65) Prior Publication Data
US 2016/0054966 A1  Feb. 25, 2016

(30) Foreign Application Priority Data
Mar. 28, 2013 (GB) .................... 1305709.6

(51) Int. Cl.
*G06F 3/147* (2006.01)
*A63F 5/00* (2006.01)
(Continued)

(52) U.S. Cl.
CPC ............ *G06F 3/147* (2013.01); *A63F 5/0005* (2013.01); *A63F 13/52* (2014.09);
(Continued)

(58) Field of Classification Search
CPC ........ G04F 3/147; A53F 13/52; A63F 5/0005; A63F 2009/2463; G07F 17/3211; G07F 17/3213; G07F 17/3216
See application file for complete search history.

(56) References Cited

U.S. PATENT DOCUMENTS

2009/0111558 A1* 4/2009 Nakamura .............. G07F 17/34
463/20
2009/0280890 A1* 11/2009 Jaffe ....................... G07F 17/32
463/20

(Continued)

*Primary Examiner* — Werner G Garner
(74) *Attorney, Agent, or Firm* — Avery N. Goldstein; Blue Filament Law PLLC

(57) ABSTRACT

A roulette wheel display arrangement and system is disclosed for displaying a winning result from the roulette wheel. The arrangement comprises a display screen which is arranged to extend around a periphery of the wheel, and a plurality of screen facets, each facet being arranged to extend adjacent a corresponding player wagering position. The arrangement further comprises a plurality of image projection units which are separately arranged to project the winning result onto a respective facet of the display screen, the screen facets being inclined toward the roulette wheel away from the respective player wagering position, such that a player can view the winning result from the wagering position on the respective screen facet. The system further comprises a detector for detecting the location of a playing member on the roulette wheel and a processor communicatively coupled with the detector and the display arrangement, for processing the location of the playing member on the roulette wheel to determine the winning result. The processor is arranged to output the winning result to the display arrangement for displaying the winning result on the display screen.

12 Claims, 4 Drawing Sheets

(51) Int. Cl.
*G07F 17/32* (2006.01)
*A63F 13/52* (2014.01)
*A63F 9/24* (2006.01)

(52) U.S. Cl.
CPC ...... *G07F 17/3211* (2013.01); *G07F 17/3213* (2013.01); *G07F 17/3216* (2013.01); *A63F 2009/2463* (2013.01)

(56) References Cited

U.S. PATENT DOCUMENTS

| | | |
|---|---|---|
| 2013/0040735 A1 | 2/2013 | Suga et al. |
| 2013/0184064 A1* | 7/2013 | Manning ............ G07F 17/3211 463/25 |
| 2015/0018092 A1* | 1/2015 | Kitamura ............ G07F 17/3211 463/30 |

* cited by examiner

GAME DISPLAY ARRANGEMENT AND SYSTEM FOR DISPLAYING A GAME RESULT FROM A GAME RESULT GENERATOR

The present invention relates to a game display arrangement and system for displaying a game result, such as a winning number, from a game result generator, such as a roulette wheel.

The game of roulette involves the use of a game result generator, namely a roulette wheel which is typically located at one end of a roulette table. The roulette wheel comprises a number of possible win outcomes or results, each of which may be selected at random by a playing member, such as a ball. The players are generally located around the table and play the game by placing a wager on the probability of a particular result occurring.

It is found that players located remote to the wheel often struggle to view the winning result in order to determine whether their wager has resulted in a win. Players must often rely on a croupier announcing the winning result or are required to relocate from their playing position around the table, to a position proximate the wheel each time the game is played, so that they can view the result.

According to a first aspect of the present invention, there is provided a game display arrangement for displaying a game result from a game result generator, the arrangement comprising a display screen comprising a screen facet, the facet being arranged to extend adjacent a player position, the arrangement further comprising an image projection unit which is arranged to project the game result onto the facet of the display screen, the facet being partially reflective of the game result, such that a player can view the game result from the player position on the screen facet and partially transmissive such that the player can view the game result generator through the facet when the game result is displayed thereon.

Advantageously, the display arrangement facilitates the display of a winning result, for example adjacent a player position, such that the player can readily determine the result, rather than attempting to read the winning result from the game result generator, such as a roulette wheel or one or more dice.

In an embodiment, the display screen extends around the game result generator and comprises a plurality of screen facets which are arranged to extend adjacent a corresponding player position, such as a player wagering position. The arrangement preferably further comprises a plurality of image projections units for separately projecting the game result onto a respective facet of the display screen. The provision of a plurality of facets, results in the image becoming displayed to the player adjacent the respective facet only. This therefore minimises any obscuration of the view of the game result generator for the other players.

The or each screen facet is arranged to extend upwardly away from the result generator and the or each projection unit is arranged to project the winning result onto the respective facet in a direction such that the projected image is incident on the facet at an acute angle thereto.

In an embodiment, the or each facet is substantially vertically orientated. In a further embodiment, the or each facet is inclined away from the respective player position.

The or each image projection unit is beneficially disposed above the display screen such that the result is projected onto the respective facet from above the facet. Preferably, the display screen is arranged to extend over the result generator, such that the facets are inclined over the result generator.

The image reflected from the facet toward the player will thus appear to be suspended above the result generator, such as a roulette wheel, in front of the player.

The or each facet preferably comprises a substantially planar section of the display screen and advantageously comprises a partially reflective, partially transmissive material, so that the player can view the displayed image and the result generator simultaneously.

In an embodiment, the display screen comprises a frustum shape, in which the facets form side walls of the frustum. A lower portion of the screen defines a polygonally shaped, open lower boundary, such as a square shape which is arranged to extend around the result generator.

The or each image projection unit may comprise a video display, such as a light emitting diode (LED), liquid crystal, Organic LED (OLED), or plasma display, for generating an image of the game result.

According to a second aspect of the present invention, there is provided a game display system for displaying a game result from a game result generator, the system comprising a game display arrangement according to the first aspect, a detector for detecting the result generated by the game result generator and a processor communicatively coupled with the detector and the display arrangement for processing the game result, the processor being further arranged to output the game result to the display arrangement for displaying the game result on the display screen.

According to a third aspect of the present invention there is provided a roulette wheel for playing the game of roulette and a game display arrangement according to the first aspect, for displaying a result from the roulette wheel.

According to a further aspect of the present invention, there is provided a roulette wheel display arrangement for displaying a winning result from the roulette wheel, the arrangement comprising a display screen comprising a screen facet, the facet being arranged to extend adjacent a player position, the arrangement further comprising an image projection unit which is arranged to project the winning result onto the facet of the display screen, the facet being partially reflective of the winning result, such that a player can view the winning result from the player position on the screen facet and partially transmissive such that the player can view the roulette wheel through the facet when the winning result is displayed thereon.

Embodiments of the present invention will now be described by way of example only and with reference to the accompanying drawings, in which.

Figure 1A:
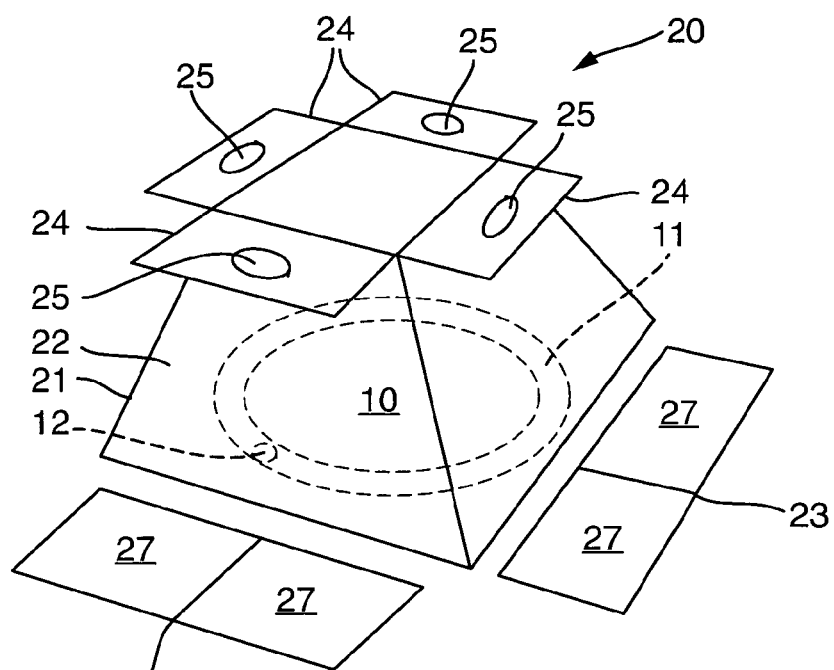
FIG. 1a is a schematic illustration of a game display arrangement according to a first embodiment of the present invention for displaying a winning result from a roulette wheel.

Referring to FIG. 1a of the drawings, there is illustrated a game result generator, such as a roulette wheel 10 according to an embodiment of the present invention, for playing the game of roulette. The roulette wheel 10 is rotatably mounted within a bowl 11 around which a playing member, such as a ball 12 is projected. During play, the wheel 10 is rotated and the ball 12 is projected around the bowl in a counter direction. As the rotational speed of the ball reduces, the ball 12 will pass onto the wheel 10 where it is arranged to locate within one of a number of recesses (not shown), which separately correspond with a particular winning result, such as a winning number and/or colour. Players (not shown) play the game by placing a wager on the probability of a particular winning result occurring. In an alternative embodiment however, which is not illustrated, the game result generator may comprise a die shaking device (not shown) which is arranged to shake one or more dice to determine the outcome of a game such as "Casino Craps" or "Backalley Dice". The die shaking device may comprise a receptacle (not shown) having a platform disposed therein upon which the die or dice (not shown) may be placed. The device may further comprise an actuator (not shown) for selectively applying a vibration to the platform to shake the dice within the receptacle to generate a game result.

FIG. 1a further illustrates a game display arrangement 20 according to a first embodiment of the present invention, for displaying the winning result from a roulette wheel 10. However, it is to be appreciated that the display arrangement 20 may be used to display the result generated by alternative game result generators, such as a dice shaking device (not shown). Referring to FIG. 1a of the drawings, the game display arrangement 20 comprises a display screen 21 which extends around the result generator, namely the roulette wheel 10, and which comprises a plurality of screen facets 22 which are inclined toward the wheel 10, away from a respective player wagering position 23. In this manner, the screen facets 22 collectively define a frustum shaped screen 21 which extends over the roulette wheel 10. A lower portion of the screen 21 defines a polygonally shaped, open lower periphery to the screen 21, which in the illustrated embodiment is square. The separate facets 22 of the screen 21 extend adjacent respective player positions, such as player wagering positions 23, whereby one or more players (not shown) may reside when playing the game.

The facets 22 comprise substantially planar sections which extend from the lower portion of the screen 21 at a position which extends around the roulette wheel 10, to an upper region disposed above the roulette wheel 10. In the illustrated embodiment, the screen 21 comprises a frusto-pyramidial shape, however the skilled reader will recognise that other shapes, such as a pentagonal frustum may also be used. The arrangement 20 further comprises a plurality of image projection units 24, comprising for example light emitting diode (LED), liquid crystal, Organic LED, or plasma video display units 25, which are arranged to project the winning result onto the respective facet 22, such that the image projected becomes incident onto the respective facet 22 at an acute angle thereto. In the illustrated embodiment, the units 24 are disposed above the display screen 21 and comprise projecting optics (not shown) comprising a lens arrangement (not shown) which is arranged to collimate the image 26 presented on the display unit 25 and direct the image 26 to the screen facet 22. The facets 22 acts as optical combiners and are arranged to re-direct the projected image 26 from the projection unit 24 to the respective player wagering position 23. The projection units 24 may be adapted to provide a mirror-inverted and/or rotated image onto the respective facet 22, and may comprise adjustment means, such as further optical elements or image processing arrangements, for adjusting optical distortions created within the projection path.

Figure 1B:
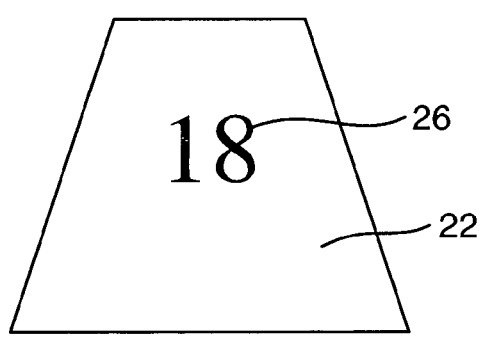
FIG. 1b is a front view of a screen facet illustrated in FIG. 1a, with the winning result displayed thereon.

The facets 22 may comprise one or more optical surface coatings (such as a monochromatic coating) for reflecting the wavelength(s) of light used to generate the projected image 26 while allowing other wavelengths of light to pass therethrough. The partially reflective, partially transmissive feature of the facets 22 ensure that the image 26 is reflected toward the respective player wagering position 23, while also enabling the players to view the roulette wheel 10, through the facet 22, when the image 26 is displayed thereon. The image projected onto the facet 22 is focussed at infinity by the lens arrangement (not shown), such that the players do not need to refocus when viewing the image 26 and the roulette wheel 10. As a result, the image appears to the players as being suspended over the roulette wheel 10, as illustrated in FIG. 1b of the drawings, and thus enables the players (not shown) to readily determine the winning result.

Figure 2:
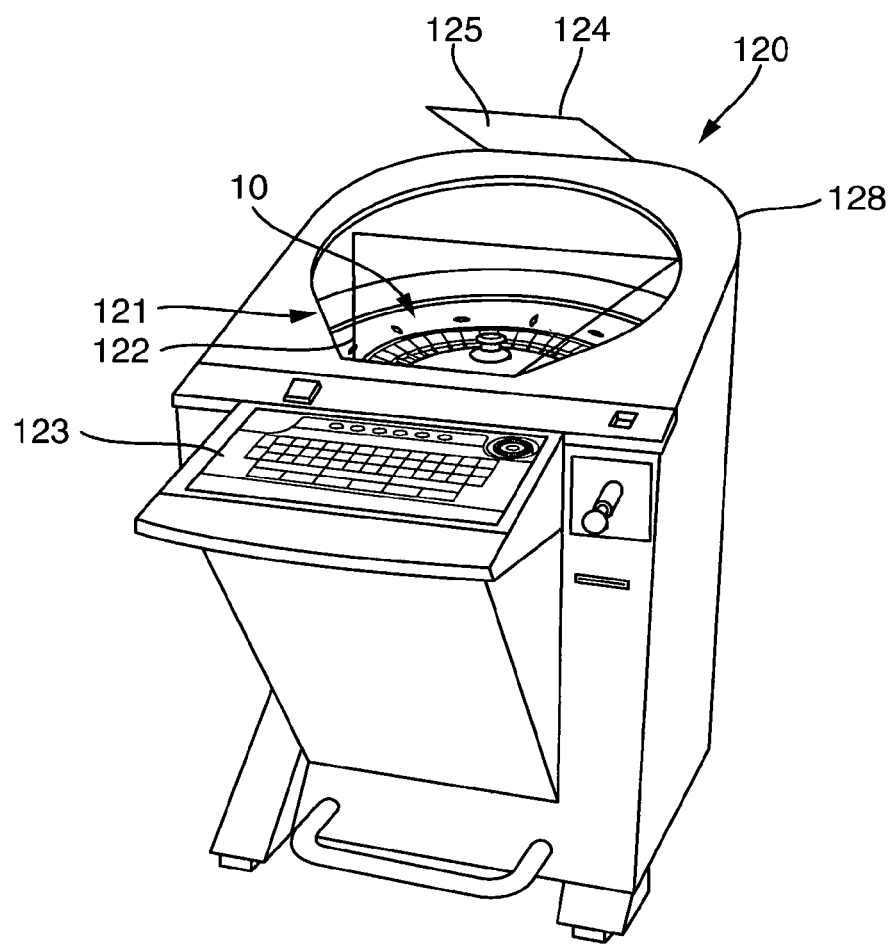
FIG. 2 is a perspective view of a game display arrangement according to a second embodiment of the present invention for displaying a winning result from a roulette wheel.

Referring to FIG. 2 of the drawings, there is illustrated a game display arrangement 120 according to a second embodiment of the present invention, for displaying the winning result from the roulette wheel 10. The arrangement 120 of the second embodiment comprises substantially the same features as the arrangement 20 of first embodiment, and as such like features have been referenced with the same numbers but increased by 100. However, the arrangement 120 of the second embodiment differs from that disclosed in the first embodiment, in that the display screen 121 comprises a single facet 122, which is supported over the wheel 10 in an inclined orientation with respect to the player wagering position 123, by a supporting wall 128 which extends around the wheel 10. The display unit 125 is disposed at an upper region of the support wall 128 within the projection unit 124, substantially opposite the player wagering position 123, and is arranged to project the winning result onto the facet 122, toward the player wagering position 123, so that the image becomes reflected off the facet 122 toward the player (not shown). Again, the image projected onto the screen 121 appears to the player as being suspended over the roulette wheel 10, by virtue of the screen facet 122 being partially reflective and partially transmissive, and thus enables a player (not shown) to readily determine the winning result from the wheel 10.

Figure 3:
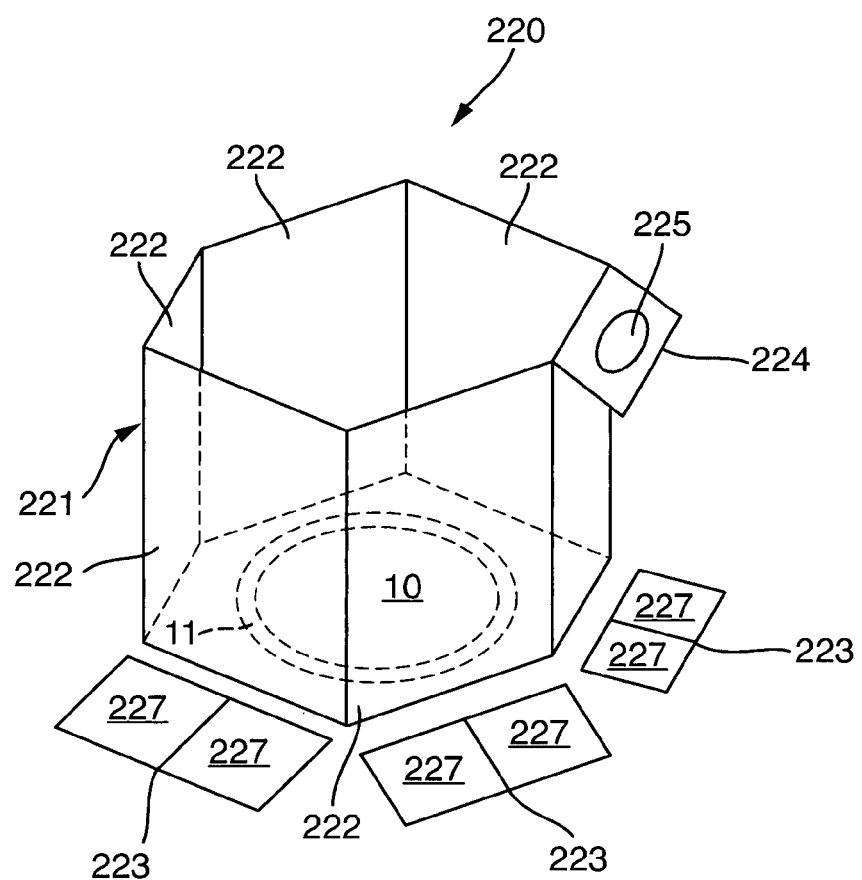
FIG. 3 is a schematic illustration of a game display arrangement according to a third embodiment of the present invention for displaying a winning result from a roulette wheel; and, FIG. 4 is a schematic illustration of a game display system according to an embodiment of the present invention.

Referring to FIG. 3 of the drawings, there is illustrated a roulette wheel display arrangement 220 according to a third embodiment of the present invention, for displaying the winning result from the roulette wheel 10. The arrangement 220 of the third embodiment comprises substantially the same features as the arrangement 20 of first embodiment, and as such like features have been referenced with the same numbers but increased by 200. However, the arrangement 220 of the third embodiment differs from that disclosed in the first embodiment, in that the display screen 221 comprises a plurality of facets 222, which extend around the roulette wheel 10 and which are substantially vertically orientated. In this manner the facets of the screen 221 comprise the side walls of a polygonal prism, such as a square or pentagonal prism. The projection units 224 (only one of which is illustrated for clarity) are disposed at an upper region of the respective facets 222, and are arranged to project the winning result onto the facet 122, so that the image becomes reflected off the facet 222 toward the respective player wagering position 223. The partially reflective and partially transmissive feature of the screen facets 222 creates the impression that the image projected on to the screen 221 is suspended over the wheel 10, and enables a player to simultaneously view the winning result on the wheel 10 through the screen 221 and the projected image.

Figure 4:
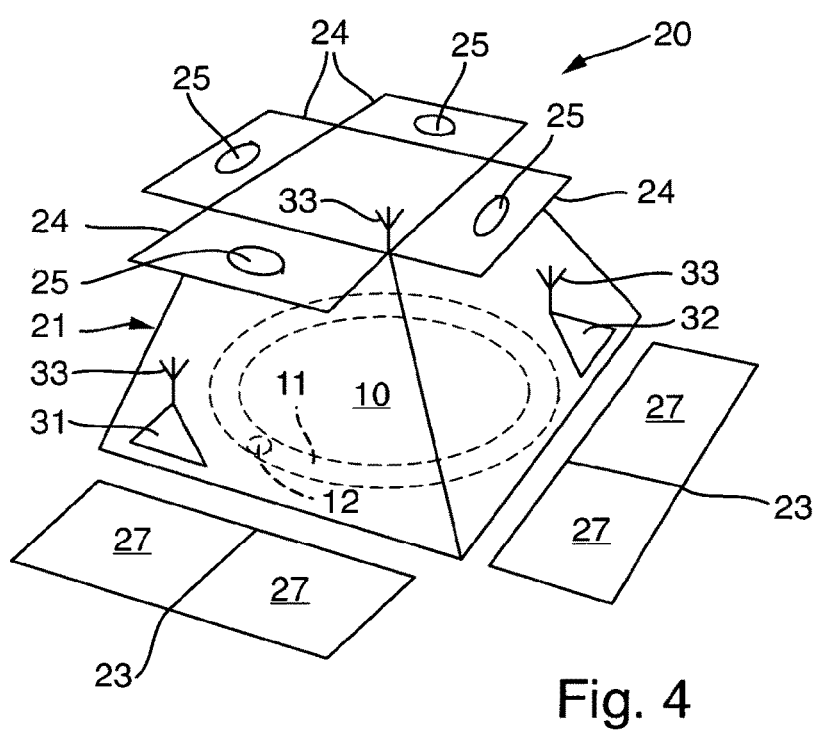

Referring to FIG. 4 of the drawings, there is illustrated a roulette wheel display system 30 for displaying a winning result from the roulette wheel according to an embodiment of the present invention. The system 30 comprises the display arrangement 20 according to the first embodiment, although the arrangement 120, 220 of the second or third embodiment may alternatively be used. The system 30 further comprises a detector 31 for detecting the location of the ball 12 on the roulette wheel 10 and is communicatively coupled with a processor 32, for example via a wireless communications link 33. The processor 32 is arranged to process signals received from the detector 31 via the link 33 to determine the winning result. The processor 32 is further communicatively coupled with the display arrangement 20 and is arranged to communicate the winning result to the display arrangement 20 so that the winning result becomes automatically displayed on the screen 21. This obviates any manual intervention for displaying the winning result on the display screen 21 and thus minimises the display of an incorrect winning result.

In use, players position themselves around the roulette wheel 10, at a player wagering position 23 disposed in front of a respective facet 22. In the embodiment illustrated in FIG. 4, it is envisaged that each facet 22 may display the result to two or more players. However, for alternative frustum shaped display screens 21 comprising a hexagonally or octagonally shaped lower periphery, for example, the facets 22 will comprise narrower sections of the display screen 21 which may present an upper limit to the number of players which may position themselves in front of a particular facet 22.

Each player position 23 comprises a respective wagering interface 27 for enabling the player to place a desired wager for a particular winning result occurring. Accordingly, once each player places the desired wager, a croupier (not shown) for example, initiates the game by rotating the wheel 10 and launching the ball 12. The ball 12 will eventually fall onto the wheel 10 and locate within one of the recesses (not shown) disposed around a periphery of the wheel 10. The detector 31 associated with the system 30 subsequently locates the position of the ball 12 upon the wheel 10 and communicates a location signal to the processor 32 which processes the signal to determine the winning result. The processor 32 then communicates the winning result to the display arrangement 20 which causes the winning result to be projected from the projection units 24 onto a respective facet 22 of the screen 21 for viewing by the players.

The displayed image 26 may comprise a static image of the winning result, such as a number presented in a colour corresponding to the winning result, or a moving view of the winning result, such as a rotating view of the winning number. In either situation, the displayed image 26 will be viewable to the players located in front of the respective facet 22 as a 3-dimentional image floating above the roulette wheel 10.

It is to be appreciated that while the game result display arrangement and system have been described above with reference to a roulette wheel, the arrangement and system may be used with other game result generators, such as the dice shaking device.

From the foregoing, it is evident that the game display arrangement and system provide for an improved gaming experience for the players by offering a more readily viewable game result.

The invention claimed is:

1. A game display arrangement for displaying a game result from a game result generator of a roulette wheel and ball or a die shaking device and die, the arrangement comprising a display screen extending above the game result generator and through which the game result generator is visible, said display screen comprising a screen facet inclined inward over the game result generator and away from a player wagering position, the arrangement further comprising an image projection unit, positioned above the game result generator and the screen facet, and arranged to project a winning result image of a winning ball placement number, colour, die face, or combination thereof from the game result generator onto the screen facet, so that the winning result image appears to be suspended over the game result generator from the perspective of the player wagering position; the game display arrangement further comprising one or more optical surface coatings for reflecting a wavelength of light used to generate the projected image while allowing other wavelengths of light to pass therethrough.

2. The game display arrangement according to claim 1, wherein the display screen comprises a plurality of screen facets which are arranged to extend each adjacent to a corresponding player position.

3. The game display arrangement according to claim 2, further comprising a plurality of image projection units for separately projecting the winning result image onto a respective screen facet of the plurality of screen facets.

4. The game display arrangement according to claim 1, wherein the image projection unit is arranged to project the winning result image onto the screen facet in a direction such that the winning result image is incident on the screen facet at an acute angle thereto.

5. The game display arrangement according to claim 1, wherein the screen facet is inclined away from the player wagering position.

6. The game display arrangement according to claim 1, wherein the image projection unit is disposed above the display screen such that the winning result image is projected onto the screen facet from above the screen facet.

7. The game display arrangement according to claim 1, wherein the display screen is arranged to extend over the game result generator, such that the screen facet is inclined over the game result generator.

8. The game display arrangement according to claim 1, wherein the screen facet comprises a planar section of the display screen.

9. The game display arrangement according to claim 1, wherein the display screen comprises a frustum shape.

10. The game display arrangement according to claim 1, wherein the image projection unit comprises a video display, for generating an image of the winning result.

11. The game display arrangement according to claim 1 further comprising a detector for detecting the winning result image generated by the game result generator and a processor communicatively coupled with the detector and the game display arrangement for processing the winning result image, the processor being further arranged to output the winning result image to the game display arrangement for displaying the winning result image on the display screen.

12. The game display arrangement according to claim 1 wherein the one or more optical surface coatings is a monochromatic coating.

* * * * *